United States Patent [19]

Park et al.

[11] Patent Number: 5,507,448
[45] Date of Patent: Apr. 16, 1996

[54] SEAT BELT APPARATUS FOR AUTOMOBILE

[75] Inventors: Jang Won Park; Jong Kak Kim; Jong Cheor Kim, all of Kangwon, Rep. of Korea

[73] Assignee: Sungwoo Corporation, Seoul, Rep. of Korea

[21] Appl. No.: 282,480

[22] Filed: Jul. 29, 1994

[30] Foreign Application Priority Data

Jul. 29, 1993 [KR] Rep. of Korea ............... 1993-14305
Dec. 3, 1993 [KR] Rep. of Korea ............... 1993-26183

[51] Int. Cl.$^6$ ................................. B60R 22/405
[52] U.S. Cl. ................................. 242/383.4; 242/383.1
[58] Field of Search ............... 242/382.4, 383.4, 242/383.1; 280/806, 807; 297/478, 480

[56] References Cited

U.S. PATENT DOCUMENTS

| | | | |
|---|---|---|---|
| 4,573,646 | 3/1986 | Willey | 242/382.4 |
| 4,583,701 | 4/1986 | Matsui et al. | 242/382.4 |
| 4,726,539 | 2/1988 | Schmidt et al. | 242/382.4 |
| 4,928,902 | 5/1990 | Tsuji | 242/383.4 |
| 5,014,926 | 5/1991 | Rumpf et al. | 242/383.4 |
| 5,232,177 | 8/1993 | Hibata | 242/383.4 |
| 5,232,178 | 8/1993 | Hirata et al. | 242/383.4 |

*Primary Examiner*—John P. Darling
*Attorney, Agent, or Firm*—Robert E. Bushnell

[57] ABSTRACT

A seat belt apparatus for an automobile includes a ratchet wheel and at least one pawl member for selectively braking a spool with respect to one direction of its rotation. The pawl member operates to perform the emergency locking and excessive-loosening preventing functions with respective to a belt. To precisely control the time for emergency stop of belt, the apparatus contains a fly wheel mass having a plurality of holes, and a web sensing spring one end of which is fixed to one of the holes. Further, to control the effective length of the belt, the apparatus includes cam protrusions, a cam gear and a cam plate which overlap to enable the distance control of the cam protrusions.

23 Claims, 5 Drawing Sheets

SEAT BELT APPARATUS FOR AUTOMOBILE

This application makes reference to, incorporates herein and claims all benefits accruing under 35 U.S.C. §119 from our patent applications entitled SEAT BELT APPARATUS FOR AUTOMOBILE earlier filed in the Korea Industrial Property Office on 29 Jul. 1993 and assigned Ser. No. 14305/1993 and entitled SEAT BELT APPARATUS FOR AUTOMOBILE earlier filed in the Korea Industrial Property Office on 3 Dec. 1993 and assigned Ser. No. 26183/1993.

BACKGROUND OF THE INVENTION

The present invention relates to a seat belt apparatus for a person's safety for a vehicle such as an automobile, and more particularly, to a seat belt apparatus which prevents a belt in an automobile from sudden loosening and varying the effective length of the belt.

In a seat belt apparatus for an automobile, it is common, during either a sudden stop, sudden acceleration or during a crash, to lock a seat belt so as to restrain a person on his or her seat, and in a situation that is not dangerous, to loosen the belt to accommodate a person's movement so as to make him or her feel comfortable during movement. Such a seat belt apparatus usually comprises a spool for rewinding the belt, a ratchet wheel and a pawl rotating along with the spool, and a spring for pulling the pawl directly or indirectly, so that, in the aforementioned dangerous situations, the pawl operates to prevent to loosening of the belt. For a method for operating the pawl, there is a well-known web sensing method for stretching the spring over a predetermined acceleration speed by sensing the speed at which the belt is loosened.

In the web sensing method, a timing for the pawl to lock the ratchet wheel is very important. If the timing is late, the belt cannot execute an appropriate function, whereas, if the belt is too sensitive, it may inconvenience the person. Therefore, it is required to match the resilience of the spring for sensing the drawing-out acceleration speed at which the web of the belt is drawn out to the predetermined drawing-out acceleration speed of the belt. However, in the conventional apparatus, since the installation position of the spring is designated at one place, its resilience can not be precisely controlled. Accordingly, this involves a problem in which the locking time of the belt becomes imprecise due to assembly tolerance.

When the belt is excessively loose or a child's seat is fixed, and then a dangerous situation happens unexpectedly, the belt cannot also function appropriately. Therefore, it is necessary to prevent the belt from loosening excessively.

SUMMARY OF THE INVENTION

Therefore, it is an object of the present invention to provide an improved seat belt apparatus.

It is another object to provide an automotive seat belt apparatus able to control the constraint time of a belt in accordance with the drawing-out acceleration speed of the belt. It is yet another object to provide a seat belt apparatus so as to reduce the rate of manufacture of poor products and to increase safety and convenience for motorists.

It is still another object of the present invention to provide an automotive seat belt apparatus able to appropriately control the length of a belt according to a person's physical condition or the size of the seat, while enhancing automotive safety.

To accomplish these and other objects, there is provided an automotive seat belt apparatus constructed according to the principles of the present invention with a spool for winding a belt; a rewinding spring, so that when the belt is forcibly pulled, the spring is rewound to retain its resilience. The spring is connected to the spool so that the spool rotates by the resilience in a direction in which the belt is wound. A ratchet wheel is integrally connected to and rotates with the spool. At least one pawl member selectively brakes the ratchet wheel. An emergency stop device operates the spool so that the ratchet wheel is braked above a predetermined acceleration speed by sensing the rotation speed of the spool to provide an emergency stop of the belt.

To alternatively accomplish the objects of the present invention, there is provided an automotive seat belt apparatus constructed with a spool for winding a belt; a rewinding spring to rewind the belt when the belt is forcibly pulled to thereby enable the spring to retain its resilience; the spring is connected to the spool so that the spool rotates by the resilience in a direction in which the belt is wound. A ratchet wheel is integrally connected with the spool and rotates therewith; at least one pawl member is used to selectively brake the ratchet wheel; and an excessive-loosening preventing device is used for braking the ratchet wheel above a predetermined rotation amount by sensing rotation amount of the spool, so as to prevent the excessive loosening of the belt.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described with reference to the attached drawings.

Figures 1A, 1B:
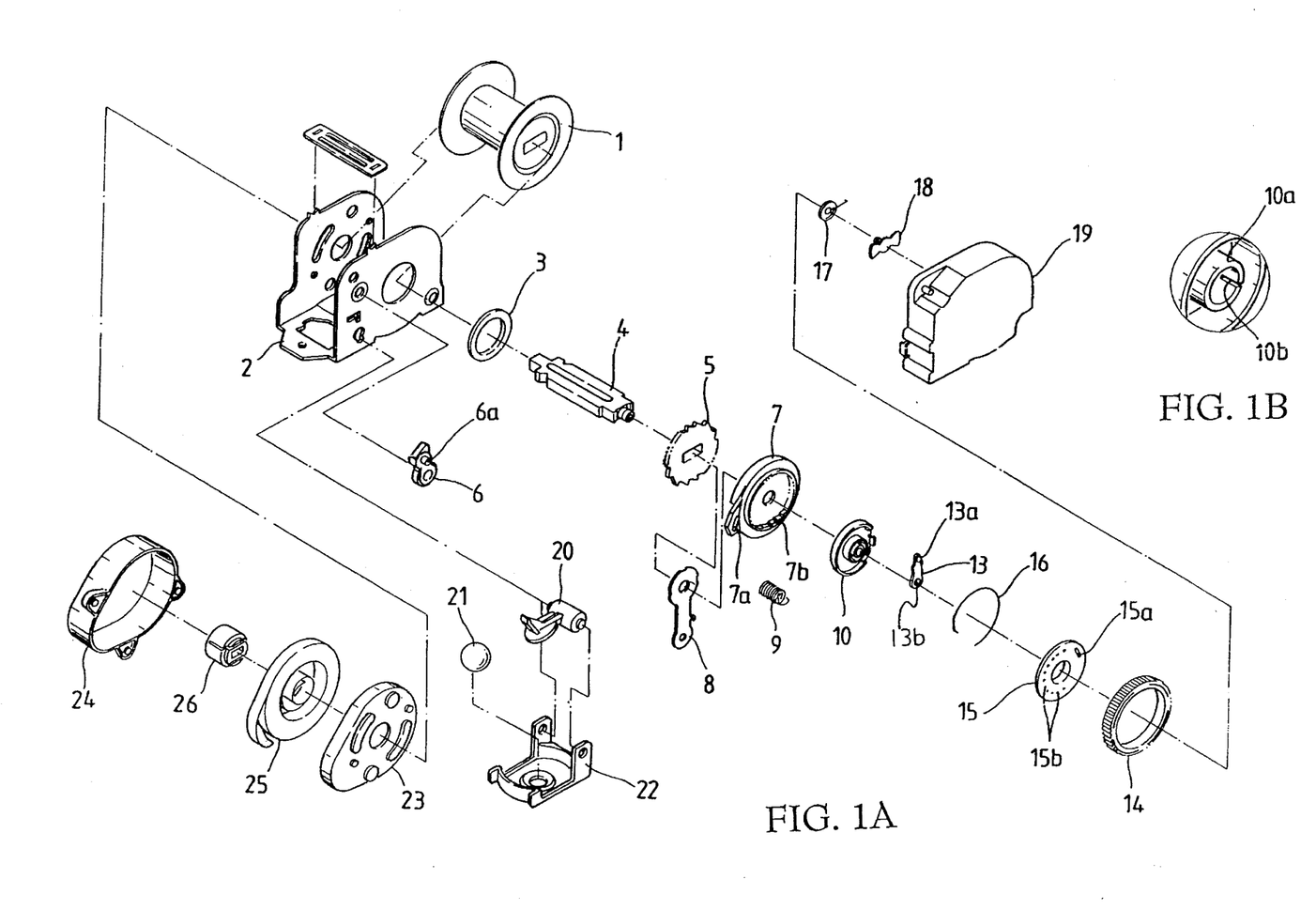
FIGS. 1A and 1B is an exploded perspective view to depict the configuration of one embodiment of an automotive seat belt apparatus constructed according to the principles of the present invention.

Referring to FIGS. 1A and 1B, reference number 1 indicates a spool for winding an ordinary belt. Spool 1 is connected with a shaft 4 rotatably supported between both sidewalls of a channel-shaped bracket 2. Spring cases 23 and 24 having a built-in rewinding spring are attached on one sidewall of bracket 2. Rewinding spring 25 is loosened from a wound state, by rotating shaft 4 in the direction in which spool 1 winds the belt. When the belt is drawn from spool 1 in the loosening direction, the spring is rewound.

A ratchet wheel 5 coupled to the end of shaft 4 and integrally rotated therewith and a pawl 6 having an interlocking pin 6a are pivoted on the other sidewall of bracket 2. A side cover 19 covering the periphery of ratchet wheel 5 is attached on the other sidewall of bracket 2. A device for emergency-stopping the belt is provided in side cover 19 and is described in the following paragraphs.

Figure 2:
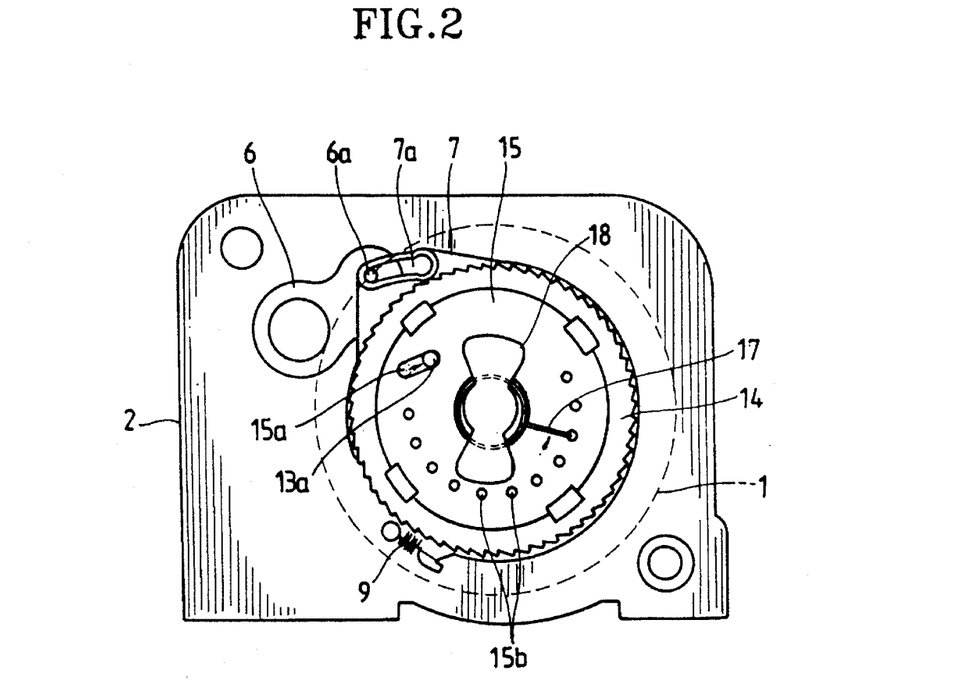
FIG. 2 is a side view to explain an emergency locking operation of a belt for the seat belt apparatus shown in FIGS. 1A and 1B.

The emergency-stopping device contains a locking ring 7, a hook retainer 10, a fly wheel 14 and a fly wheel mass 15". Locking ring 7 is installed to be able to race by surrounding ratchet wheel 5, having an interlocking hole 7a to which interlocking pin 6a of pawl 6 is inserted, and a sawtooth portion 7b formed on the inner circumference of the locking ring. Hook retainer 10 is also received to be able to race in sawtooth portion 7b of locking ring 7. The hook retainer contains a boss 10a coupled to rotate with the end of shaft 4 piercing the center of locking ring 7, and a hook 13 having a pivot 13b engaged by hook retainer 10 to go in and out from sawtooth portion 7b of locking ring 7. Here, a recess 10b is formed on boss 10a of hook retainer 10. A protrusion pin 13a is formed on hook 13. The recess and protrusion pin will be described later. Fly wheel 14 and fly wheel mass 15 are integrally connected and are able to race due to friction created by a clutch spring 16. Fly wheel 14 is installed so as to be able to race with respect to hook retainer 10. Fly wheel mass 15 is able to race with respect to retainer 10 only within a range which a cam hole 15a permits since the retainer mass 15 has slanted cam hole 15a to which protrusion pin 13a of hook 13 is inserted (as is seen in FIG. 2) so as to interlock and thereby move hook 13 to sawtooth portion 7b of locking ring 7. In a farther range, fly wheel mass 15 rotates with hook retainer 10. In other words, hook 13 is interlocked as fly wheel mass 15 rotates with fly wheel 14 and races with hook retainer 10.

One end of a web sensing spring 17 inserted to the periphery of boss 10a of hook retainer 10 via fly wheel mass 15 is inserted to recess 10b formed on boss 10a. The other end of spring 17 is inserted into one of a plurality of holes 15b formed on fly wheel mass 15. The web sensing spring thereby elastically biases fly wheel mass 15 so that hook 13 is detached from sawtooth portion 7b of locking ring 7 (as is shown in phantom in FIG. 3). The resilience of web sensing spring 17 is controlled according to the position of hole 15b selected on fly wheel mass 15 to which the other end of spring 17 is inserted. Also, according to the degree of its resilience, the degree of inertial rotation of fly wheel mass 15 with respect to hook retainer 10 rotating spool 1 is controlled. This is designed to interrupt the rotation of spool 1 above a speed at which safety is considered, by corresponding to the spool rotation speed when the belt is suddenly loosened in either a sudden stop, sudden acceleration or crash of cars.

In FIG. 1A, reference number 3 indicates a bearing. Reference number 8 indicates a tie plate. Reference number 9 is a spring for restoring locking ring 7. Reference number 18 is a cap pin connected to the end of shaft 4 for preventing the detachment of web sensing spring 17. Reference number 20 is a jaw for restricting fly wheel 14. Reference number 21 is a ball for sensing the inertia of a car. Reference number 22 is a ball base. Reference number 26 is a spring bushing.

Figure 3:
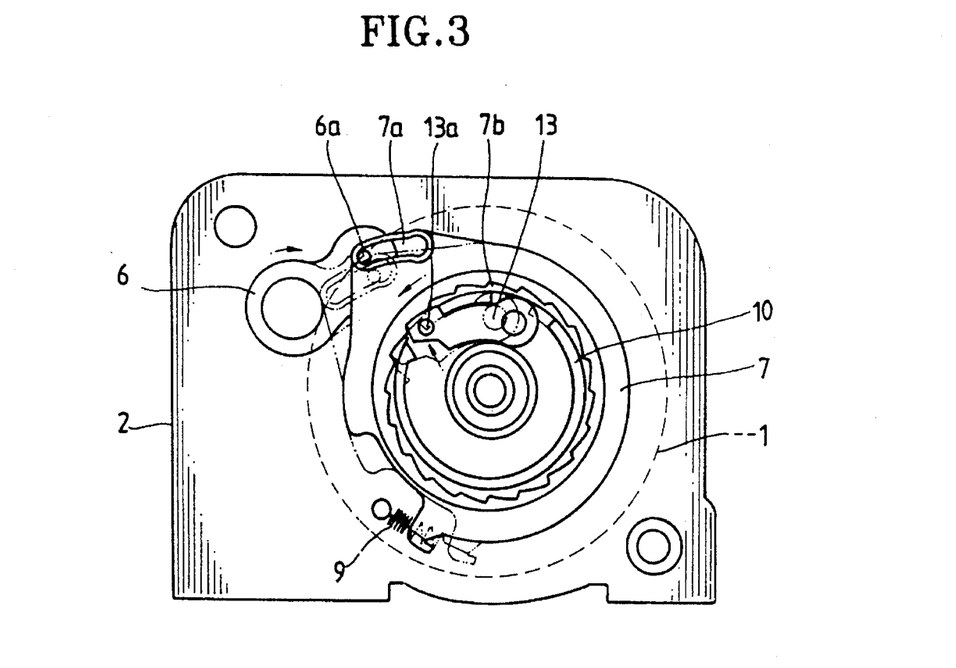
FIG. 3 is a side view of FIG. 2 with part thereof removed.

According to the above embodiment of the safety belt apparatus, an operation of constraining the belt in emergency situations will be explained below with reference to FIGS. 2 and 3.

In an initial state, as shown in FIG. 2, fly wheel mass 15 is pushed counterclockwise by web sensing spring 17. Since protrusion pin 13a is located inside cam hole 15a, hook 13 can engage sawtooth portion 7b of locking ring 7. Locking ring 7 is pulled clockwise by spring 9 so that pawl 6 having interlocking pin 6a inserted into interlocking hole 7a is detached from ratchet wheel 5. Spool 1 and ratchet wheel 5 are free to rotate. In this state, when emergency situations such as sudden stop, sudden acceleration or a crash between cars occur, the belt is suddenly pulled and the rotation speed of spool 1 increases drastically. Here, if the acceleration force of spool 1 surpasses the resilience of web sensing spring 17, fly wheel mass 15 does not rotate and only hook retainer 10 rotates with hook 13. In this state, protrusion pin 13a of hook 13 moves from the inner end of cam hole 15a to the outer end thereof. Then, as shown in FIG. 3, hook 13 interlocks with sawtooth portion 7b of locking ring 7 and locking ring 7 rotates counterclockwise. When locking ring 7 rotates counterclockwise, pawl 6 rotates clockwise. To hook ratchet wheel 5 by the interlocking of interlocking hole 7a and interlocking pin 6a. Therefore, the rotation of ratchet wheel 5 is stopped and spool 1 is in a state in which the spool can not rotate in the loosening direction of the belt. In the present invention, the position of hole 15b of web sensing spring 17 is selected so as to control the emergency locking time of the belt, resulting in secure operation.

Figure 4:
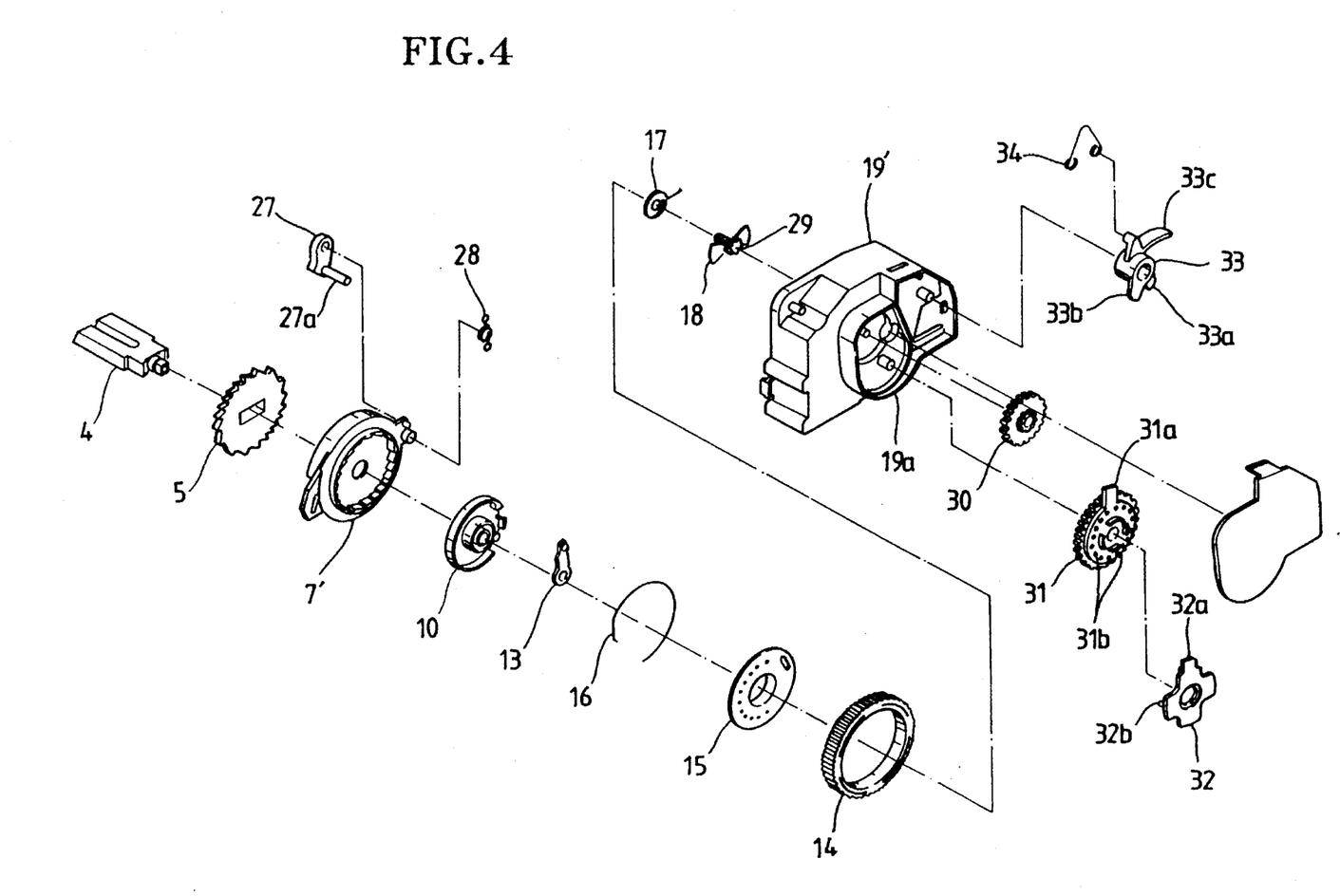
FIG. 4 is an exploded perspective view of part of an alternative embodiment of an automotive seat belt apparatus constructed according to the principles of the present invention.

FIG. 4 shows another embodiment of the present invention, which further comprises a means for preventing excessive loosening of the belt. This embodiment contains a locker 27 pivoted on locking ring 7', elastically biased toward ratchet wheel 5 by spring 28 and having an arm 27a, a driving gear 29 formed on the aforementioned pin cap 18 for generating a force, a connection gear 30 and a cam gear 31 mounted on gear receiver 19a of side cover 19 and sequentially driven by driving gear 29, a cam plate 32 integrally coupled to cam gear 31, and a cam lever 33.

Cam gear 31 and cam plate 32, which overlap with each other, comprise cam protrusions 31a and 32a, a plurality of holes 31b and a protrusion 32b both of which are formed to control the distance between cam protrusions 31a and 32a. Cam lever 33 is rotatably supported by side cover 19', and has two cam interlocking portions 33a and 33b for engaging cam protrusions 31a and 32a, respectively, and an arm interlocking portion 33c for engaging interlocking arm 27a of locker 27. The cam lever 33 is also attached to spring 34 for providing resilience so as to maintain changed positions of cam protrusions 31a and 32a and cam interlocking portions 33a and 33b.

Figure 5:
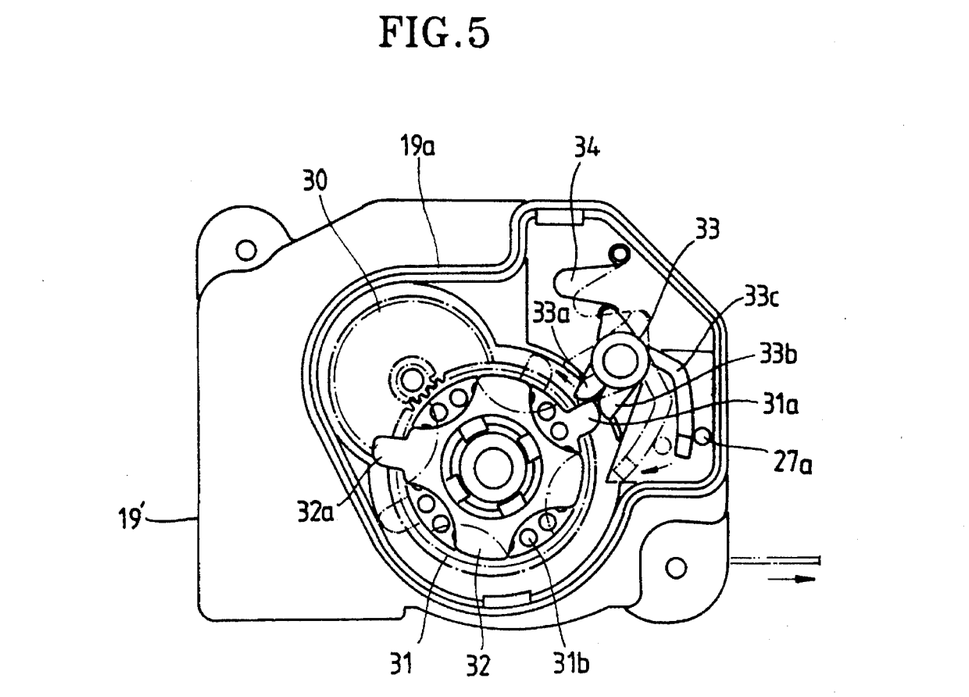
FIG. 5 is a side view presented to explain an operation of preventing excessive loosening of a belt in the seat belt apparatus of FIG. 4.
Figure 7:
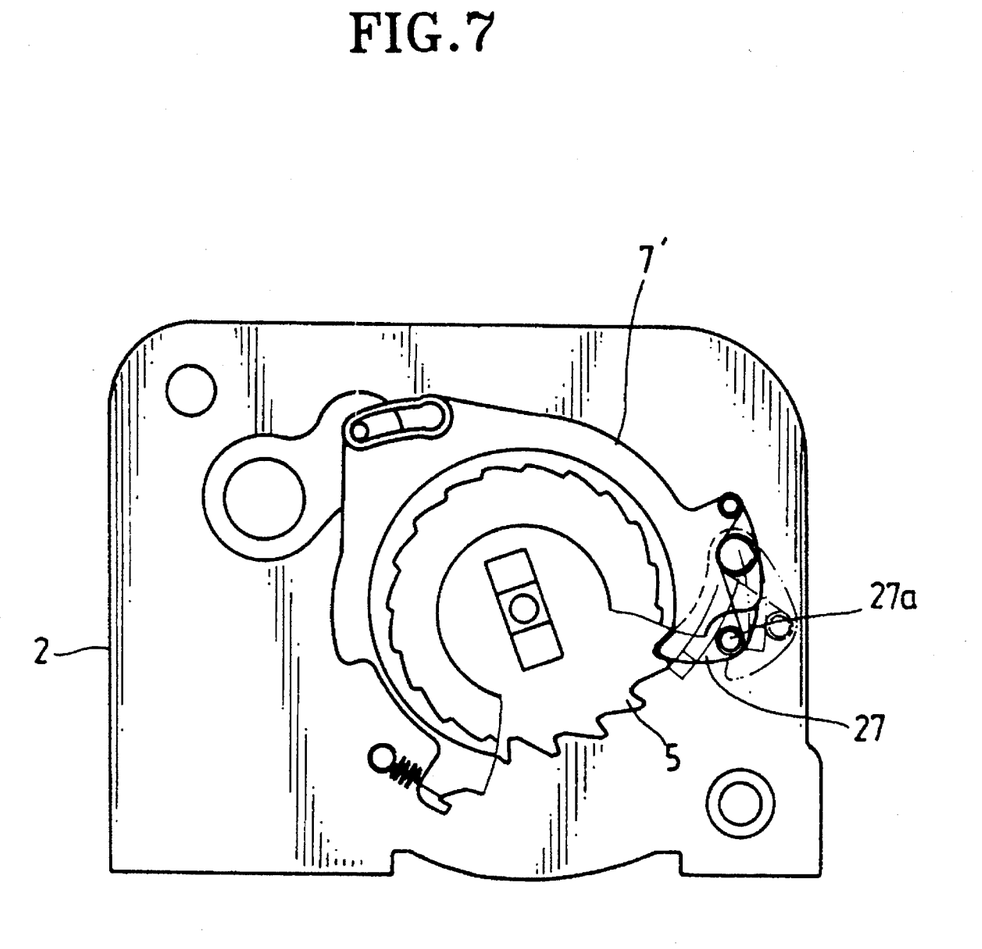
FIG. 7 is a side view presented to explain the belt locking state after the operation of illustrated by FIG. 5.

In the embodiments of the present invention, the belt can be drawn out from the aforementioned spool until cam protrusion 31a of cam gear 31 pushes one side of cam interlocking portion 33a of cam lever 33 as cam gear 31 rotates counterclockwise. In this state, if the belt is drawn out further, cam protrusion 31a pushes and passes cam interlocking portion 33a as shown by a virtual line of FIG. 5. Therefore, cam lever 33 rotates clockwise and maintains this state. Here, as shown in FIG. 7, arm 27a of locker 27 pushed by arm interlocking portion 33c of cam lever 33 advances so that locker 27 hooks ratchet wheel 5 and therefore the rotation of ratchet wheel 5 stops. This prevents the belt from unwinding from the spool any more.

Figure 6:
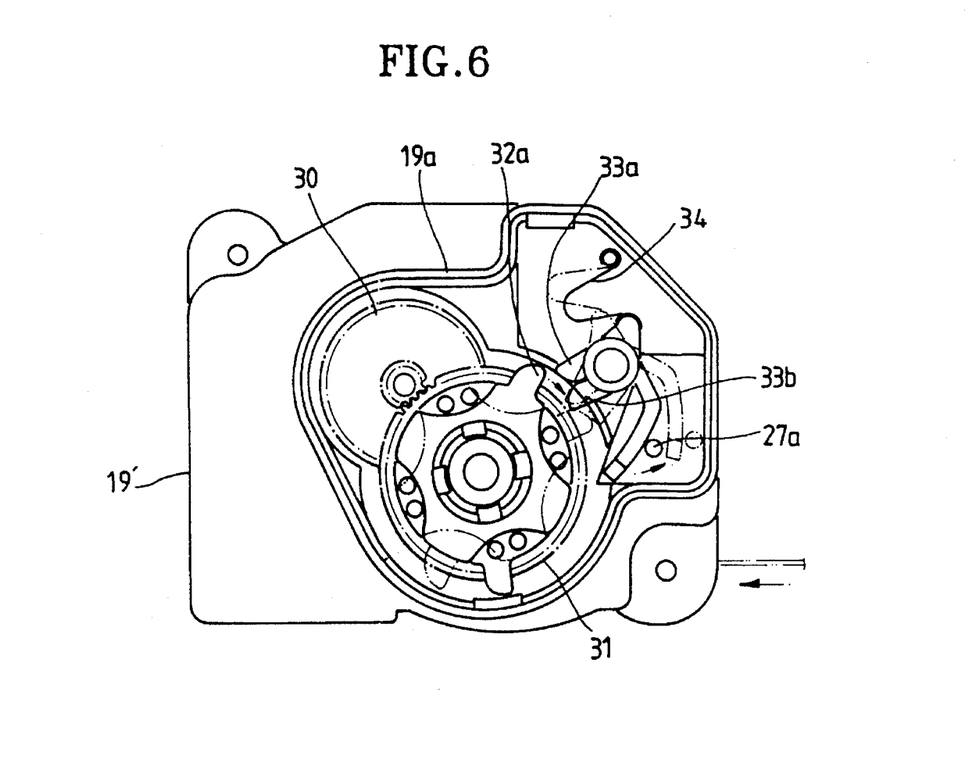
FIG. 6 is a side view presented to explain an operation of releasing the belt from a locking state after the operation illustrated by FIG. 5.

In order to release the state in which the belt cannot be loosened from the spool, as shown in FIG. 6, it is necessary to wind the belt around the spool so that cam plate 32 rotates until cam protrusion 32a of cam plate 32 engages cam interlocking portion 33b of cam lever 33. According to the embodiments of the present invention, the assembly position of cam gear 31 is controlled and the distance between cam protrusion 31a of cam gear 31' and cam protrusion 32a of cam plate 32 is appropriately controlled so that the effective length of the belt can be controlled according to the physical condition of a person as safely and appropriately as possible.

As described above, the present invention, in a safety belt apparatus for an automobile which facilitates the loosening of the belt so as for a person not to feel uncomfortable in moving his or her body and fixes the belt in emergency, overcomes danger and inconvenience caused due to improper emergency locking time of the belt. Further, this invention reduces the rate of poor products. Furthermore, this invention controls the effective length of the belt according to the physical condition of a person or seat size so that adults as well as children can use this invention without danger and inconvenience.

While the invention has been particularly shown and described with reference to preferred embodiments thereof, it will be understood by those skilled in the art that various changes in form and details are possible without departing from the spirit and scope of the invention.

What is claimed is:

1. A seat belt apparatus for an automobile, comprising:
   a belt;
   a spool for rotating in a first direction to wind said belt around said spool; and for rotating in a second direction opposite to said first direction to unwind said belt from said spool;
   a rewinding spring for rotating said spool in said first direction to wind said belt around said spool when said belt is forcibly pulled to rotate said spool in said second direction;
   a ratchet wheel integrally connected with said spool and rotating with said spool;
   at least one pawl member for selectively engaging said ratchet wheel to prevent rotation of said ratchet wheel and said spool in said second direction; and
   emergency stopping means for enabling said at least one pawl member to engage said ratchet wheel and prevent rotation of said ratchet wheel and said spool in said second direction, said emergency stopping means comprising:
      a locking ring having a saw-toothed portion formed on an inner periphery of said locking ring and a first cam slot formed on an outer portion of said locking ring, said locking ring being biased to rotate in said first direction;
         flywheel means having a second cam dot and in said flywheel means said flywheel means being biased to rotate in said second direction;
         hooking means having a pin positioned within said second cam slot of said flywheel means, said pin traversing said second cam slot and enabling said hooking means to engage said saw-toothed portion of said locking ring and cause rotation of said locking ring in said second direction when a first force rotating said spool in said second direction exceeds a second force biasing said flywheel means to rotate in said second direction, said at least one pawl member engaging said ratchet wheel and preventing rotation of said ratchet wheel and said spool in said second direction in response to rotation of said locking ring in said second direction.

2. The seat belt apparatus as claimed in claim 1, further comprised of means for applying said second force to bias said flywheel means to rotate in said second direction being manually adjustable by user to vary a magnitude of said second force.

3. The seat belt apparatus as claimed in claim 1, wherein said first plurality of holes formed in said flywheel means accommodate insertion of one end of a sensing spring that biases said flywheel means to rotate in said second direction, said second force being adjusted by a user by inserting said one end of said sensing spring into a selected one of said first plurality of holes.

4. The seat belt apparatus as claimed in claim 1, further comprising means for preventing loosening of said belt beyond a predetermined limit by preventing rotation of said ratchet wheel and said spool in said second direction whenever said belt is unwound from said spool by an amount corresponding to said predetermined limit.

5. The scat belt apparatus as claimed in claim 4, wherein said means for preventing loosening of said belt comprises:
   locking means for engaging said ratchet wheel to prevent the rotation of said ratchet wheel and said spool in said second direction;
   at least one gear member for rotating in response to rotation of said ratchet wheel and said spool;
   a cam gear having a first protrusion and rotating in response to rotation of said at least one gear member;
   a cam plate integrally connected to said cam gear to rotate concentrically with said cam gear, said cam plate having a second protrusion positioned a predetermined distance from said first protrusion; and
   a cam lever comprising first and second interlocking portions for respectively engaging said first and second protrusions to enable rotation of said cam lever in dependence upon rotation of said cam gear and said cam plate, said cam lever further comprising a third interlocking portion for enabling said locking means to engage said ratchet wheel in dependence upon rotation of said cam lever.

6. The seat belt apparatus as claimed in claim 5, further comprising a second plurality of holes formed within and positioned circumferencially around said cam gear and a pin extending outwardly from said cam plate, said pin inserting into one of said second plurality of holes to control said predetermined distance between said first protrusion and said second protrusion.

7. The seat belt apparatus as claimed in claim 6, wherein said predetermined distance between said first protrusion and said second protrusion determines said predetermined limit that said belt can be loosened.

8. The seat belt apparatus as claimed in claim 7, wherein said predetermined limit that said belt can be loosened is adjustable by a user.

9. A seat belt apparatus for an automobile, comprising:
   a belt;
   a spool for rotating in a first direction to wind said belt around said spool, and for rotating in a second direction opposite said first direction to unwind said belt from said spool;
   a ratchet wheel having a first saw-toothed portion formed on an outer periphery and rotating concentrically with said spool, said spool rotating in said first direction whenever said ratchet wheel rotates in said first direction and said spool rotating in said second direction s whenever said ratchet wheel rotates in said second direction;

a locking ring having a second saw-toothed portion formed on an inner periphery of said locking ring and a first cam slot formed on an outer portion of said locking ring, said locking ring being biased to rotate in said first direction;

pawl means having a first pin positioned within said first cam slot of said locking ring, said first pin traversing said first cam slot and causing said pawl means to engage said first saw-toothed portion and prevent rotation of said ratchet wheel and said spool in said second direction in response to rotation of said locking ring in said second direction;

flywheel means having a second cam slot and a first plurality of holes formed in said flywheel means, said flywheel means being biased by a spring to rotate in said second direction; and hooking means having a second pin positioned within said second cam slot of said flywheel means, said second pin traversing said second cam slot and enabling said hooking means to engage said second saw-toothed portion and cause rotation of said locking ring in said second direction when a first force rotating said spool in said second direction exceeds a second force biasing said flywheel means to rotate in said second direction.

10. The apparatus as claimed in claim 9, further comprised of said second force biasing said flywheel means to rotate in said second direction being adjustable by a user.

11. The apparatus as claimed in claim 10, wherein said second force exhibits a magnitude in dependence upon placement by the user of a protruding end of said spring into one of said first plurality of holes formed in said flywheel means.

12. The apparatus as claimed in claim 11, further comprising a rewinding spring for causing rotation of said spool in said first direction to wind said belt around said spool when said belt is forcibly pulled to rotate said spool in said second direction.

13. The apparatus as claimed in claim 9, wherein said second force exhibits magnitude in dependence upon placement by a user of a protruding end of said spring into one of said first plurality of holes formed in said flywheel means.

14. The apparatus as claimed in claim 9, further comprising a rewinding spring for causing rotation of said spool in said first direction to wind said belt around said spool when said belt is forcibly pulled to rotate said spool in said second direction.

15. The apparatus as claimed in claim 9, further comprising means for preventing loosening of said belt beyond a predetermined limit by preventing rotation of said spool in said second direction whenever said belt is unwound from said spool by an amount corresponding to said predetermined limit.

16. The apparatus as claimed in claim 15, wherein said means for preventing loosening of said belt comprises:

locking means for engaging said ratchet wheel to prevent the rotation of said ratchet wheel and said spool in said second direction;

a cam gear having a first protrusion and rotating in response to rotation of said spool;

a cam plate concentrically connected to said cam gear to rotate with said cam gear, said cam plate having a second protrusion positioned a predetermined distance from said first protrusion; and a cam lever comprising first and second interlocking portions for respectively engaging said first and second protrusions to enable rotation of said cam lever in dependence upon rotation of said cam gear and said cam plate, said cam lever further comprising a third interlocking portion for enabling said locking means to engage said ratchet wheel in dependence upon rotation of said cam lever.

17. The seat belt apparatus as claimed in claim 16, further comprising a second plurality of holes formed within and positioned circumferencially around said cam gear and a pin extending outwardly from said cam plate, said pin inserting into one of said second plurality of holes to control said predetermined distance between said first protrusion and said second protrusion.

18. The apparatus as claimed in claim 17, wherein said predetermined distance between said first protrusion and said second protrusion determines said predetermined limit that said belt can be loosened.

19. The seat belt apparatus as claimed in claim 18, wherein said predetermined limit that said belt can be loosened is adjustable by a user.

20. A seat belt apparatus for an automobile, comprising:

a belt;

a spool for rotating in a first direction to wind said belt around said spool and for rotating in a second direction opposite said first direction to unwind said belt from said spool;

a rewinding spring for rotating said spool in said first direction to wind said belt around said spool when said belt is forcibly pulled to rotate said spool in said second direction;

a ratchet wheel integrally connected with said spool and rotating concentrically with said spool; and means for preventing loosening of said belt beyond a predetermined limit by preventing rotation of said ratchet wheel and said spool in said second direction whenever said belt is unwound from said spool by an amount corresponding to said predetermined limit, said means for preventing loosening of said belt comprising:

locking means for engaging said ratchet wheel to prevent the rotation of said ratchet wheel and said spool in said second direction;

a cam gear having a first protrusion and a plurality of holes formed within and circumferencially around said cam gear, said cam gear rotating in response to rotation of said ratchet wheel and said spool;

a cam plate integrally connected to said cam gear to rotate concentrically with said cam gear, said cam plate having a second protrusion positioned a predetermined distance from said first protrusion and a pin that inserts into one of said plurality of holes formed in said cam gear to control said predetermined distance between said first protrusion and said second protrusion, said predetermined distance between said first protrusion and said second protrusion being indicative of said predetermined limit that said belt can be loosened; and a cam lever comprising first and second interlocking portions for respectively engaging said first and second protrusions to enable rotation of said cam lever in dependence upon rotation of said cam gear and said cam plate, said cam lever further comprising a third interlocking portion for enabling said locking means to engage said ratchet wheel in dependence upon rotation of said cam lever.

21. The seat belt apparatus as claimed in claim 20, wherein said predetermined limit that said belt can be loosened is adjustable by a user.

22. A scat belt apparatus for an automobile, comprising:

a belt;

a spool for rotating in a first direction to wind said belt around said spool, and for rotating in a second direction opposite said first direction to unwind said belt from said spool;

a rewinding spring for rotating said spool in said first direction to wind said belt around said spool when said belt is forcibly pulled to rotate said spool in said second direction;

a ratchet wheel integrally connected with said spool and rotating concentrically with said spool;

emergency stopping means for preventing rotation of said ratchet wheel and said spool in said second direction in response to occurrence of a force urging said belt to unwind from said spool with a magnitude beyond a first predetermined limit capable of being set by a user; and means for preventing loosening of said belt beyond a second predetermined limit by preventing rotation of said ratchet wheel and said spool in said second direction whenever said belt is unwound from said spool by an amount corresponding to said second predetermined limit, said means for preventing loosening of said belt comprising:

locking means for engaging said ratchet wheel to prevent the rotation of said ratchet wheel and said spool in said second direction;

a cam gear having a first protrusion and a plurality of holes formed within and circumferencially around said cam gear, said cam gear rotating in response to rotation of said ratchet wheel and said spool;

a cam plate integrally connected to said cam gear to rotate concentrically with said cam gear, said cam plate having a second protrusion positioned a predetermined distance from said first protrusion and a pin that inserts into one of said plurality of holes formed in said cam gear to control said predetermined distance between said first protrusion and said second protrusion, said predetermined distance between said first protrusion and said second protrusion being indicative of said second predetermined limit that said belt can be loosened; and a cam lever comprising first and second interlocking portions for respectively engaging said first and second protrusions to enable rotation of said cam lever in dependence upon rotation of said cam gear and said cam plate, said cam lever further comprising a third interlocking portion for enabling said locking means to engage said ratchet wheel in dependence upon rotation of said cam lever.

23. The seat belt apparatus as claimed in claim 22, wherein said second predetermined limit that said belt can be loosened is adjustable by the user.

* * * * *

UNITED STATES PATENT AND TRADEMARK OFFICE
CERTIFICATE OF CORRECTION

PATENT NO. : 5,507,448
DATED : April 16, 1996
INVENTOR(S) : Jang-Won Park, et al.

It is certified that error appears in the above-indentified patent and that said Letters Patent is hereby corrected as shown below:

Column 1 Line 62, after "belt." begin new paragraph with sentence "It is yet another";

Column 3 Line 32, after "since" delete "the retainer";

Column 4 Line 12, before "speed" change "rotation" to --rotational--;

Column 4 Line 21, after "clockwise" change ".To" to --to--;

Column 4 Line 36, after "cover" change "19" to --19'--;

Column 5 Line 52, after "cam" change "dot" to --slot--;

Column 5 Line 52, after "and" insert --a first plurality of holes formed--;
Claim 5 Line 1, and Claim 22 Line 1, before "belt" change "scat" to --seat--:

Signed and Sealed this

Twenty-fifth Day of February, 1997

Attest:

BRUCE LEHMAN

*Attesting Officer*          *Commissioner of Patents and Trademarks*